United States Patent [19]
Lalonde et al.

[11] Patent Number: 4,886,607
[45] Date of Patent: Dec. 12, 1989

[54] APPARATUS FOR FILTERING, RETAINING AND DISPOSAL OF WASTE WATER ACCUMULATED ON A BOAT

[75] Inventors: Eugene L. Lalonde, Salmon Arm; Michael R. Bruynesteyn; Thomas M. Unger, both of Vancouver, all of Canada

[73] Assignee: Aqua Trend Systems Inc., Salmon Arm, Canada

[21] Appl. No.: 323,891

[22] Filed: Mar. 15, 1989

[51] Int. Cl.⁴ .......................... C02F 3/00; E03D 1/00; E03D 9/00

[52] U.S. Cl. .................................. 210/739; 114/270; 210/109

[58] Field of Search .................. 210/805, 754, 85, 86, 210/97, 103, 104, 109, 112, 114, 115, 134, 137, 143, 153, 171, 172, 779, 767, 739, 744; 114/183 R, 184, 270; 4/321, 323, 353, 354, 661

[56] References Cited

U.S. PATENT DOCUMENTS

| | | |
|---|---|---|
| 1,292,146 | 1/1919 | Taylor . |
| 1,325,310 | 12/1919 | Zaun . |
| 1,530,789 | 3/1925 | Scott . |
| 1,749,356 | 3/1930 | Ross . |
| 2,858,939 | 11/1958 | Corliss . |
| 3,472,390 | 10/1969 | Pall et al. . |
| 3,557,388 | 1/1971 | Bach . |
| 4,045,314 | 8/1977 | Rod et al. ........................ 210/754 |
| 4,324,007 | 4/1982 | Morris . |
| 4,359,789 | 11/1982 | Roberts ........................... 210/805 |
| 4,391,703 | 7/1983 | Crosby . |
| 4,516,281 | 5/1985 | MacPherson et al. . |
| 4,687,584 | 8/1987 | Urbani . |
| 4,734,943 | 4/1988 | Mellinger et al. . |

FOREIGN PATENT DOCUMENTS

| | | |
|---|---|---|
| 1061445 | 8/1979 | Canada . |
| 1063230 | 9/1979 | Canada . |
| 1112350 | 11/1981 | Canada . |
| 1140247 | 1/1983 | Canada . |
| 1151761 | 8/1983 | Canada . |

OTHER PUBLICATIONS

Zurn Drainage and Control System Ltd. Grease Interceptor Product No. Z-1170, Product Data Sheet, Nov. 25, 1980.

Lowrance Electronics Inc. 12000 E. Skelly Drive, Tulsa, Oklahoma, 74128 U.S.A., 1989 Catalog, pp. 6, 7, 20, 21, 22, 23.

Primary Examiner—Frank Sever
Attorney, Agent, or Firm—Shlesinger & Myers

[57] ABSTRACT

An apparatus for filtering, retaining and disposal of waste water accumulated on a boat. The apparatus includes a tank and a device for controlling the flow of waste water from the tank. The device includes a depth measuring instrument responsive to water depth below the boat. The depth measuring instrument provides a depth signal representing the water depth below the boat in relation to the a pre-determined water depth. The depth signal is received by a signal generating device operable to generate a discharge signal in response to the depth signal. The discharge signal is received by a discharge device which discharges waste water from the tank in response to the discharge signal.

32 Claims, 5 Drawing Sheets

| DEPTH SIGNAL | 1ST WATER LEVEL SIGNAL | 2ND WATER LEVEL SIGNAL | PUMP STATE | NEXT PUMP STATE |
|---|---|---|---|---|
| (ACTIVE) DEEP WATER | TANK WATER LEVEL ABOVE 1ST LEVEL (ACTIVE) | TANK WATER LEVEL ABOVE 2ND LEVEL | PUMP OFF | PUMP ON |
| | | | PUMP ON | |
| | | TANK WATER LEVEL BELOW 2ND LEVEL | IMPOSSIBLE | IMPOSSIBLE |
| | TANK WATER LEVEL BELOW 1ST LEVEL (INACTIVE) | TANK WATER LEVEL ABOVE 2nd LEVEL | PUMP OFF | PUMP OFF |
| | | | PUMP ON | PUMP ON |
| | | TANK WATER LEVEL BELOW 2ND LEVEL | PUMP OFF | PUMP OFF |
| | | | PUMP ON | PUMP OFF |
| (INACTIVE) SHALLOW WATER | TANK WATER LEVEL ABOVE 1ST LEVEL (ACTIVE) | TANK WATER LEVEL ABOVE 2ND LEVEL | PUMP OFF | PUMP OFF |
| | | | PUMP ON | PUMP OFF |
| | | TANK WATER LEVEL BELOW 2ND LEVEL | IMPOSSIBLE | IMPOSSIBLE |
| | TANK WATER LEVEL BELOW 1ST LEVEL (INACTIVE) | TANK WATER LEVEL ABOVE 2ND LEVEL | PUMP OFF | PUMP OFF |
| | | | PUMP ON | PUMP OFF |
| | | TANK WATER LEVEL BELOW 2ND LEVEL | PUMP OFF | PUMP OFF |
| | | | PUMP ON | PUMP OFF |

FIG. 5

APPARATUS FOR FILTERING, RETAINING AND DISPOSAL OF WASTE WATER ACCUMULATED ON A BOAT

BACKGROUND OF THE INVENTION

Field of the Invention

The apparatus relates to a device for filtering, retaining and disposal of waste water accumulated on a boat.

Many boats, particularly houseboats, include facilities for storage of waste water resulting from use of toilets, showers, sinks etc. Often, a single tank is used to store waste water from such devices until the tank can be emptied either by pumping or by dumping the waste water into the water surrounding the boat. It is not environmentally acceptable to dump such waste water into the surrounding water as this can create pollution problems particularly in lakes etc. Thus, it has been preferable to store waste water until the boat is moored and the tank can be pumped out.

The storage of waste water in a boat requires a relatively large tank which uses an area of the boat which could otherwise be used for storage of goods, food etc. A large tank, when full, can be relatively heavy which can lead to vessel stability problems if the weight of the tank is not apportioned properly. In addition, the storage of waste water in a tank requires the tank be emptied at frequent intervals to avoid unpleasant overflowing of the tank. Furthermore, in order to empty the tank, provisions must be made on land to accommodate mass disposal of the waste water.

It has been found that waste water on a boat can be categorized into two distinct classes. The first class is Grey water, which refers to water from galley sinks, bathroom sinks, showers, bath tubs etc. or from generally any facility of the boat except the toilet. The second class refers to waste from the toilet otherwise known as sewage. Grey water can be released into the water surrounding the boat without presenting an environmental threat. Sewage cannot be released, it must be stored and emptied from a tank as required. Because grey water volume is usually much larger than sewage volume, discharging of grey water would considerably reduce the problem of waste water storage.

The discharge of grey water into the water surrounding the boat can create unpleasant effects, particularly if the discharge occurs in the near shore area. Aesthetically, discharging any material such as grey water in the vicinity of swimmers, bathers, campers, lakeshore property owners or others, is offensive. Any significant amount of grey water dispersed in a concentrated area could create a health concern, particularly if the area does not have a frequent natural change of water (i.e. current).

Discharging grey water itself does not constitute a threat to the environment, particularly if biodegradable cleaning materials are used in sinks and showers and if a pre-filtering device is utilized to filter out grease and solid particles. Filtered grey water is actually very much like the natural runoff entering the lake system except that grey water volume, by comparison, is smaller. It therefore is practical to discharge grey water into a lake or other body of water provided the discharge takes place in deep water areas and provided a pre-filtering device is used to minimize the discharge of grease and solid particles etc. Thus, there is a need for a device to filter, retain and dispose of grey water accumulated on a boat and to allow discharge of that water only when the depth of the water under the boat exceeds a pre-determined value. Such a device is described in greater detail herein.

SUMMARY OF THE INVENTION

According to the invention, an apparatus for disposal of waste water from a tank in a boat comprises a depth measuring device responsive to water depth below the boat. The depth measuring device provides a depth signal representing the water depth in relation to a pre-determined water depth. The apparatus further includes signal generating means for generating a discharge signal in response to the depth signal. Discharging means is provided for discharging waste water from the tank in response to the discharge signal.

In addition, the invention provides an apparatus for retaining and disposing of waste water from a boat. The apparatus includes a depth measuring device responsive to water depth below the boat. The depth measuring device provides a depth signal representing the water depth in relation to a pre-determined water depth. The apparatus further includes signal generating means for generating a discharge signal in response to the depth signal. The apparatus also has a tank for receiving and retaining waste water and discharge means for discharging waste water from the tank, the discharge means being responsive to the discharge signal.

The invention also teaches a method of controlling the flow of waste water from a tank in a boat, the method comprising the steps of:

(a) measuring the depth of water below the boat and generating a depth signal representing water depth in relation to a pre-determined water depth;

(b) generating a discharge signal in response to the depth signal;

(c) discharging waste water from the tank in response to the discharge signal.

BRIEF DESCRIPTION OF THE DRAWINGS

FIG. 5 is a state table illustrating the operation of the signal generating circuit.

DESCRIPTION OF THE PREFERRED EMBODIMENT

Figure 1:
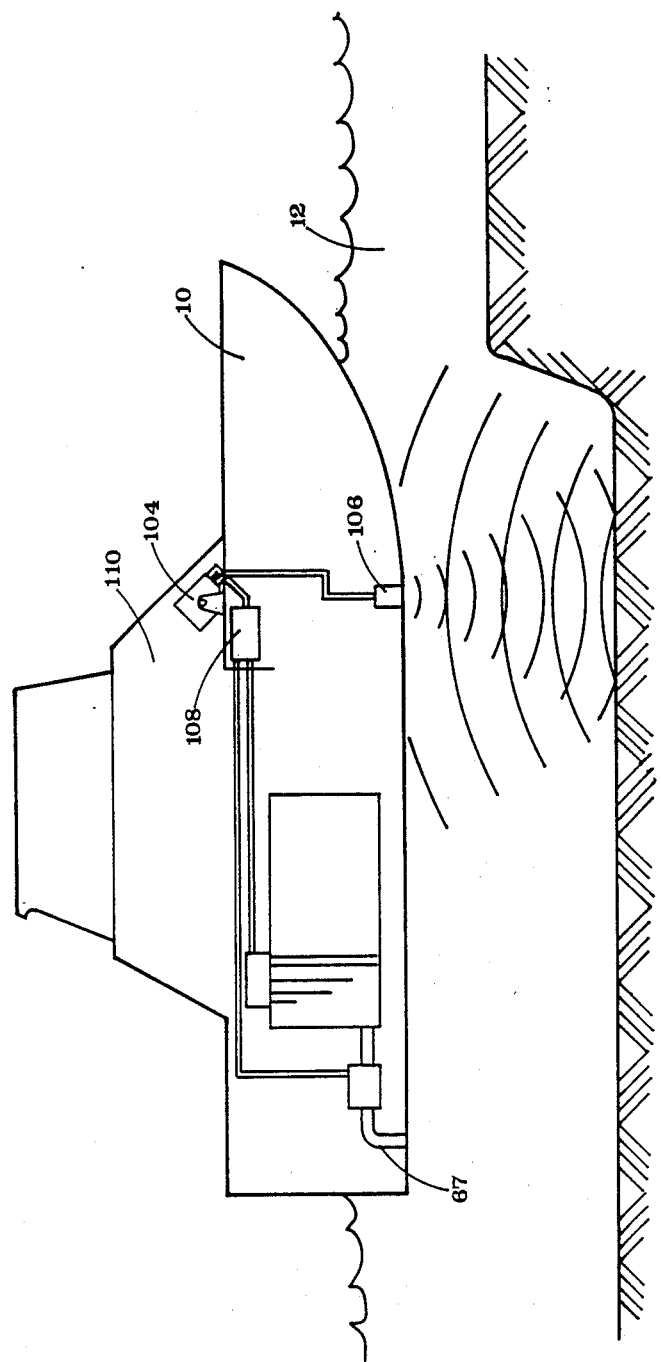
FIG. 1 is a simplified, schematic diagram of an apparatus according to the invention.
Figure 2:
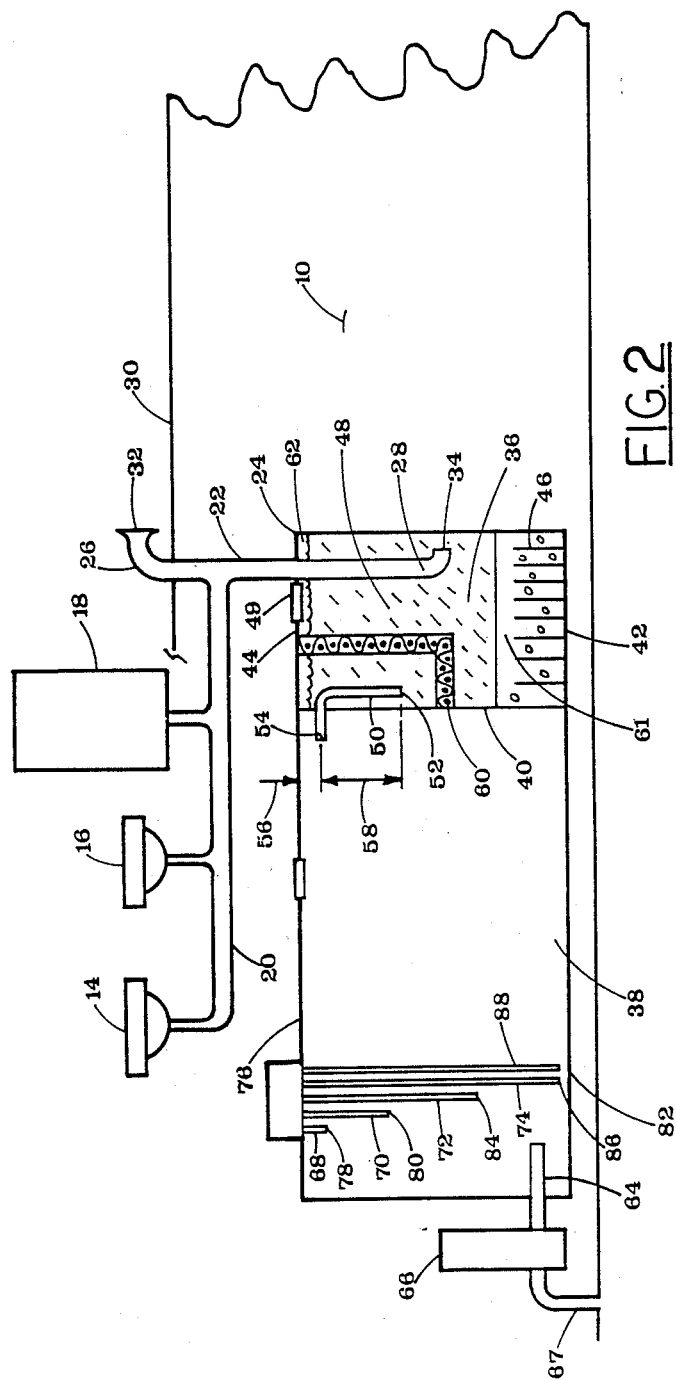
FIG. 2 is a schematic diagram illustration of an apparatus for filtering and retaining grey water according to an embodiment of the invention.

FIGS. 1 and 2

Referring to FIG. 1, a boat 10 is shown on a body of water 12 such as a lake or harbour etc. The boat in this embodiment is a cabin cruiser, but may alternatively be a houseboat or other marine vessel of sufficient size to include a shower, bathroom sink, kitchen sink or other such devices. Generally, the boat includes at least one device from which waste water flows.

Referring to FIG. 2, the boat of this embodiment includes a kitchen sink 14, a bathroom sink 16 and a shower 18. Conventional plumbing pipes, connectors and fixtures connect each of the devices to a common drain conduit 20. The common drain conduit is connected to a main drain conduit 22 which is connected to a tank 24.

The main drain conduit 22 has an upper end portion 26 and a lower end portion 28. The upper end portion projects upwardly above the deck 30 of the boat 10 and has a first opening 32 which allows air to escape from or pass into the tank 24. The lower end portion 28 projects downward into the tank and has a second opening 34 for introducing waste water into the tank. Waste water from the sinks 14 and 16 or from shower 18 flows through the common drain conduit 20 into the main drain conduit 22 and out of the second opening 34 into the tank 24.

The tank 24 includes a pre-filter chamber 36 for pre-filtering the waste water and has a retention chamber 38 for holding filtered waste water. A bulkhead 40 acts as a partition to define the pre-filter and retention chambers within the tank. Waste water flowing from the main drain conduit 22 flows into the pre-filter chamber 36.

The pre-filter chamber 36 in this embodiment is generally cylindrical in cross-section but may alternatively be rectangular in shape. The chamber has a bottom portion 42 and a top portion 44. A plurality of spaced apart partitions 46 are located along the bottom portion 42 and extend upwards towards a centre portion 48 of the chamber. The partitions are so disposed to trap particles which are heavier than water. The partitions act as solid particle entrapment means to trap solid material such as food particles, soap globules and toothpaste etc. and therefore remove such particles from the waste water. The top portion 44 of the chamber has a clean out bung 49 to permit access to the interior of the chamber for cleaning.

The tank 24 further includes a conduit 50 for communicating fluid between the pre-filter chamber 36 and the retention chamber 38. The conduit has a first opening 52 in communication with the pre-filter chamber and has a second opening 54 in communication with the retention chamber. The second opening 54 is spaced apart vertically downwards by a first distance 56 from the top portion 44 of the chamber. The first opening 52 is spaced apart further vertically downwards by a second distance 58 from the second opening 54. A mesh screen 60 extends from the top portion 44 of the chamber and bends in a right angle to connect with the bulkhead 40. The screen has a plurality of relatively small apertures to prevent particles which may be suspended in the waste water, from passing through the screen and entering the first opening 52 of the conduit. The conduit and the position of the first and second openings 52 and 54 provides grease entrapment means in the pre-filter chamber as to be more fully described below.

As waste water exits from the second opening 34 in the main drain 22, it falls on the plurality of partitions 46 at the bottom 42 of the pre-filter chamber 36. Any solid particles in the waste water will accumulate between the partitions 46 and form a solid particle layer 61 at the bottom portion 42.

The waste water may contain grease, such as cooking grease, which is likely to be suspended in the waste water when it enters the pre-filter chamber 36. Over a period of time, the grease will solidify and float to the surface of the waste water, forming a layer of grease 62 thereon. As waste water enters the pre-filter chamber the water level rises and hence the grease layer 62 also rises. When the water level rises to the level of the second opening 54 in the conduit 50, the first opening 52 will be submerged in the water below the grease layer and the conduit 50 will be filled with filtered waste water. Filtered waste water will thus flow through the conduit 50 out of the second opening 54 and into the retention chamber 38. Thus, only filtered waste water can enter the retention chamber.

In short, as waste water enters the pre-filter chamber 36 the solid particle layer 61 accumulates near the bottom portion 42 of the chamber and the grease layer 62 accumulates near the top portion 44 of the chamber. The remaining water is disposed in a layer between the solid particle layer 61 and the grease layer 62. Water in this layer passes through the mesh screen 60 where it is filtered before entering the first opening 52 of the conduit 50. The apparatus thus allows only filtered water to enter the conduit 50 and hence only filtered water can flow through the conduit and enter the retention chamber 38. The retention chamber thus accumulates and holds only filtered waste water.

Figure 3:
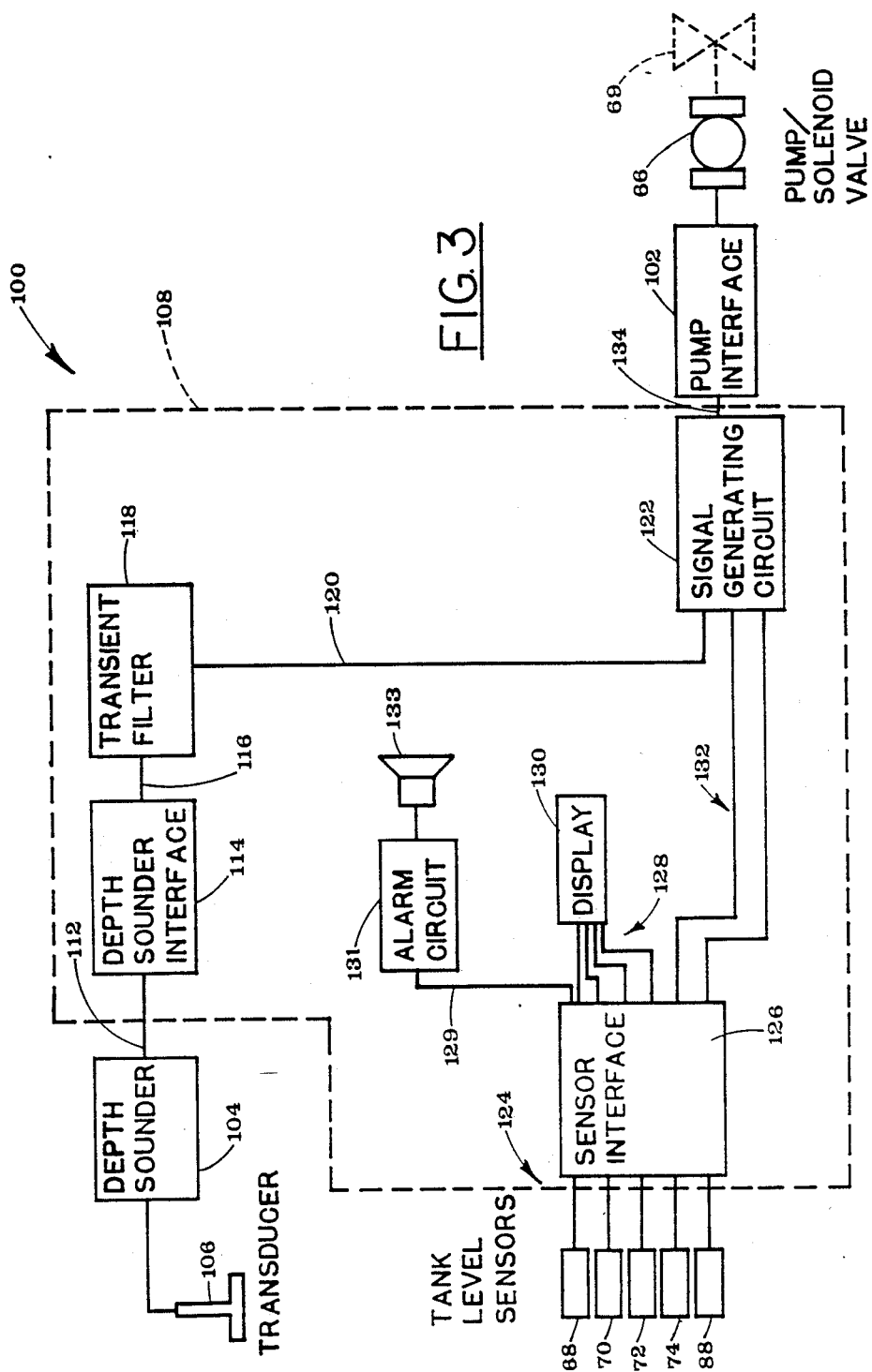
FIG. 3 is a block diagram of an electrical control circuit for controlling the disposal of filtered grey water.

The retention chamber 38 has a discharge conduit 64 which is connected to an inlet of discharge means such as a pump 66 or solenoid valve shown in broken outline at 69 in FIG. 3. The pump is the preferred discharge means where the tank is below the waterline of the boat as in this embodiment. The solenoid valve may be preferred in situations where the tank can be emptied by gravity. An outlet of the pump is connected to an exhaust conduit 67 having an opening submerged in the water 12 under the boat 10 as shown in FIG. 1. The pump can be operated, as to be more fully described below, to empty the retention chamber by pumping filtered water from the retention chamber out through the exhaust conduit 67 and into the body of water 12.

Referring back to FIG. 2, the retention chamber has fluid level sensors which, in this embodiment, are in the form of four conductive rods 68, 70, 72 and 74, having vertically spaced apart bottom portions 78, 80, 84 and 86 respectively. The rods extend downwards from a top portion 76 of the retention chamber 38. The rods may be made of stainless steel or other such non-corrosive electrically conductive material. The conductive rods are used in detecting the level of waste water at four discrete points in the retention chamber 38 corresponding to bottom portions of the rods. The first rod 68 represents the full level and extends into the chamber such that its bottom portion 78 is near the top portion 76 of the chamber. The second rod 70 represents the two-thirds full level and extends into the chamber such that its bottom portion 80 is two-thirds of the distance from a bottom portion 82 to the top portion 76 of the chamber. The third sensor 72 represents the one-third level and extends into the chamber such that its bottom portion 84 is one-third of the distance from the bottom portion 82 to the top portion 76 of the chamber. The fourth rod 74 represents the empty level and extends into the chamber such that its bottom portion 86 is a few centimeters from the bottom portion 82 of the chamber. A fifth rod 88 acts as a common rod and extends similarly to the fourth rod 74 to a few centimeters above the bottom 82 of the chamber 38. The rods 68, 70, 72, 74 and 88 act as waste water level detecting means to generate waste water level signals as will be described below.

FIGS. 1 and 3

Referring mainly to FIG. 3, a block diagram of an apparatus for controlling the disposal of waste water from the tank is shown generally at 100. The apparatus includes the conductive rods 68, 70, 72 and 74, common rod 88 and pump 66 of FIG. 2. The apparatus further includes a pump interface 102, a depth sounder 104, transducer 106 and a control circuit indicated in broken outline at 108.

Referring to FIG. 1, the depth sounder 104 is of the type having a built-in depth alarm annunciator and an integral alarm circuit for producing an alarm signal which cause the depth alarm annunciator to sound when the measured depth is less than a pre-determined depth. The depth sounder is situated in the pilot area 110 of the boat 10. The transducer 106 is connected to the depth sounder 104 and is mounted through the hull of the boat as is commonly known in the art. The control circuit 108 is laid out on a typical printed wiring board mounted in a housing also situated in the pilot area 110 of the boat 10.

Referring back to FIG. 3, in the preferred embodiment, the depth alarm annunciator is disconnected from the integral alarm circuit. A first signal wire 112 connects the integral alarm circuit of the depth sounder 104 to a depth sounder interface 114 of the control circuit 108. A first circuit board conductor 116 connects the depth sounder interface to a transient filter 118. The depth sounder interface 114 and the transient filter 118 co-operate to provide a signal conditioning circuit. A second circuit board conductor 120 connects the transient filter to a signal generating circuit 122. The sensor rods 68, 70, 72, 74 and the common rod 88 are connected by a first group of signal wires shown generally at 124, to a sensor interface 126 of the control circuit 108. The sensor interface is connected by a first group of circuit board conductors, shown generally at 128, to a display device 130 and is connected by a second group of circuit board conductors, shown generally at 132, to the signal generating circuit 122. The signal generating circuit is connected by a second signal wire 134 to the pump interface 102. The pump interface is situated near and is connected to the pump 66.

The sensor interface is also connected by a further circuit board conductor 129 to an alarm circuit 131. The alarm circuit 131 is connected to a speaker 133 for producing an audible sound when the retention chamber is full. The detached depth alarm annunciator of the depth sounder could be used as the speaker 133. The alarm circuit 131 and speaker 133 thus provide signalling means for signalling an operator when the waste water level is near a top portion of the tank.

Figure 4:
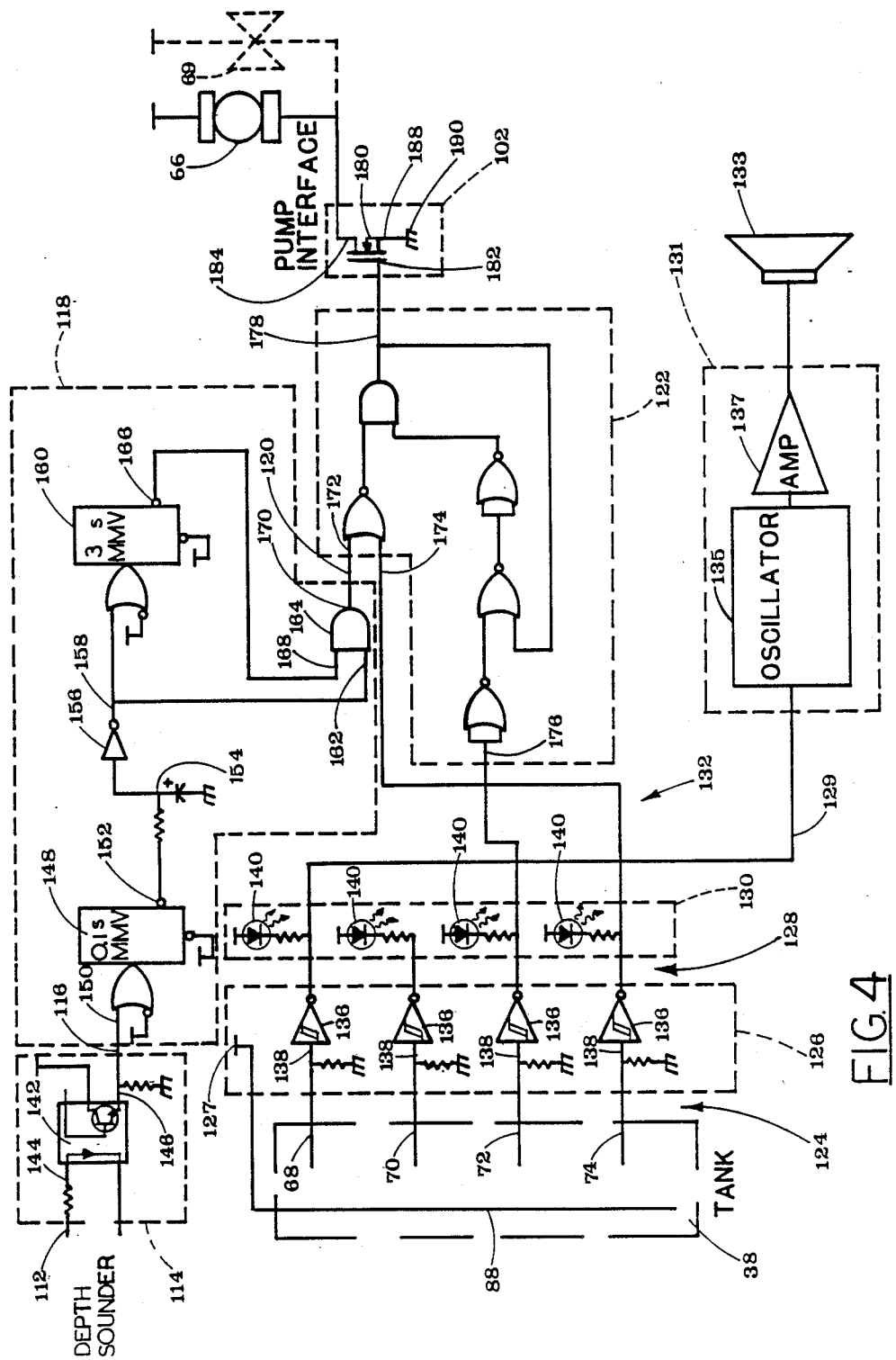
FIG. 4 is a simplified electrical schematic diagram of the control circuit for controlling the flow of waste water.

FIGS. 3 and 4

Referring mainly to FIG. 4, circuit components implementing the blocks of FIG. 3 are illustrated.

The depth sounder interface 114 includes an optical isolator circuit 142. The optical isolator prevents voltage spikes or noise occurring in the depth sounder circuit from being coupled to the control circuit 108. The optical isolator has an input 144 which is connected by the first signal wire 112 to the integral alarm circuit in the depth sounder 104 of FIG. 3. An output 146 of the optical isolator is connected by first circuit board trace 116 to the transient filter 118.

When the integral alarm circuit activates the alarm signal, a series of voltage pulses are produced on the first signal wire 112. The first signal wire 112 transmits these voltage pulses to the input 144 of the optical isolator. A series of corresponding output pulses are produced at the output 146 of the optical isolator 142.

When the depth sounder control circuit is not activating the alarm anunciator, no pulses appear at the output 146. Pulses only appear at the output 146 when the measured depth is less than the pre-determined depth.

The transient filter 118 includes a first one-shot circuit 148 which acts as a first time delay element. The one-shot has an input 150 connected to the first circuit board conductor 116 for receiving pulses from the output 146 of the optical isolator 142. The one-shot also has an output 152 connected to a resistor-capacitor (RC) delay circuit 154 which acts as a second time delay element. The RC delay circuit is connected to a Schmitt trigger inverter 156 having an output 158 connected to a second one-shot 160 and to a first input 162 of a first AND gate 164. The second one-shot 160 acts as a third time delay element and has an output 166 which is connected to a second input 168 of the first AND gate 164. The first AND gate has an output 170 connected by second circuit board trace 120 to the signal generating circuit 122. The transient filter serves to reject transient responses of the depth sounder.

Upon receiving an output pulse from output 146 of the optical isolator 142, the first one-shot 148 is activated thereby tending to discharge the RC delay circuit 154. If no further output pulses are received from the optical isolator within 0.1 seconds, the one-shot is re-set and discharging of the RC delay circuit 154 is discontinued. Such may be the case in the event of a noise pulse caused by the depth sounder or if a single fish were to swim under the transducer of the depth sounder.

In the event that several pulses are received by the first one-shot 148, as is the case when the depth sounder 104 is measuring the surrounding water depth as being less than the pre-determined depth, discharging of the RC delay circuit 154 continues. Discharging continues until an output voltage of the RC delay circuit is below a pre-set value determined by the characteristics of the Schmitt trigger inverter 156. When the output voltage drops below the pre-set value, the output 158 of the Schmitt trigger buffer 156 is activated thereby rendering the first input 162 of the first AND gate 164 active and also triggering the second one-shot 160. The second one-shot is pre-configured to have a time delay of approximately 3 seconds and activates its output 166 after the expiry of this period of time. When the output 166 is activated, both inputs to the first AND gate 164 are active and the output 170 of the AND gate is rendered active. The signal appearing on the output of the AND gate 164 is a depth signal representing the water depth below the boat in relation to a pre-determined water depth. In digital logic terms, when the depth signal voltage level is high, the water depth below the boat is greater than the pre-determined level. When the voltage level is low, the water depth is less than the pre-determined level. The time delay elements act to delay the operation of the depth signal to prevent false activation of the device due to fish or motor noise, etc, until a valid water depth measurement is obtained.

The sensor interface 126 supplies a current from a common positive power supply terminal 127 to the common rod 88. Current flows from the common rod through the filtered waste water which is usually conductive to each sensor rod in contact with the water in the retention chamber. For example, if the retention chamber is one half full, the third and fourth sensor rods 72 and 74 will be in contact with the water and hence will receive current. The first group of signal wires 124 carries the current from the sensor rods, in this example rods 72 and 74, to the sensor interface 126. The sensor interface includes four Schmitt trigger inverters 136 having resistor grounded inputs 138 which are connected to respective signal wires of the first group of signal wires 124. The inverters 136 buffer the received current and send waste water level signals to the display 130, to the alarm circuit 131 and to the signal generating circuit 122.

In this embodiment, the display 130 includes 4 LEDs 140 corresponding to the four sensor rods 68, 70, 72 and 74. When the waste water is in contact with any of the four sensor rods, the corresponding LED is activated, thus indicating to a boat operator the level of waste water in the retention chamber 38.

As illustrated in FIG. 2, the first conductive rod 68 is disposed in the retention chamber such that its bottom portion 78 is near the top portion 76 of the chamber. Referring back to FIG. 4, the first conductive rod 68 is connected to one of the Schmitt trigger inverters 136 which provides a logic low signal when the first conductive rod 68 is in contact with waste water in the chamber.

The Schmitt trigger 136 corresponding to the first conductive rod 68 has an output which is connected by circuit board conductor 129 to the alarm circuit 131. The alarm circuit includes an oscillator 135 and an amplifier 137. The circuit board trace 129 is connected to the oscillator which is enabled by the logic low level signal appearing on conductor 129. The amplifier 137 is connected to a speaker 133 which produces an audible sound in response to the logic low signal on circuit board trace 129 and hence a sound is produced in response to a full waste water level in the retention chamber.

The Schmitt trigger inverters corresponding to the third and fourth conductive rods 72 and 74 send signals via the second group of circuit board conductors 132 to the signal generating circuit 122. The signal produced by the Schmitt trigger inverter corresponding to the third sensor 72 represents a first waste water level signal and the signal corresponding to the fourth sensor 74 represents a second waste water level signal. The sensor interface thus provides the first waste water level signal representing waste water in relation to an upper point in the tank and provides a second waste water level signal representing waste water level in relation to a lower point in the tank.

The output of the signal generating circuit 122 is connected to the pump interface 102. The signal generating circuit 122 is a combinational logic circuit comprised of digital logic elements including AND and NOR gates. The circuit 122 has first, second, and third inputs 172, 174 and 176 and has a first output 178. Each input is responsive to an active high signal level. The depth signal, the first water level signal and the second water level signal are received at the first, second and third inputs, respectively. The output is a discharge signal which is also an active high signal level.

The pump interface 102 includes a switching device such as a relay or a power transistor. In the preferred embodiment the switching device is a power transistor illustrated as MOSFET 180. The discharge signal is received at a gate terminal 182 of the MOSFET. A source terminal 184 is connected to a pump control relay coil for controlling the pump 66 and a drain terminal 188 is connected to a circuit ground connection 190. When the discharge signal is active, the MOSFET 180 acts like a closed switch thereby completing a circuit allowing current to flow from the power source 127, through the pump control relay coil and through the MOSFET 180 to the ground connection 190. The pump 66 is thus rendered operative.

OPERATION

When the depth of the water 12 under the boat 10 is greater than the pre-determined value, the depth signal will be active. When the water level in the retention chamber 38 is above the one third level, the first waste water level signal and the second waste water level signal will be active. The signal generator circuit 122 will thus render the discharge signal active thereby activating the pump 66 to empty the retention chamber 38. The attention of the boat operator is not necessary as the signal generator circuit makes the necessary decision to empty the retention chamber and controls the pump as required.

If the boat 10 is in water 12 of a depth greater than the pre-determined depth, the state of the discharge signal and hence the operation of the pump 66 is determined by the level of waste water in the retention chamber. The waste water level is detected by the sensor rods which control the first waste water level signal and the second waste water level signal. The signal generator circuit then issues the discharge signal and hence controls the pump 66 depending upon the past and present states of first and second water level signals.

Use of the shower 18 or sinks 14 or 16 will raise the level of waste water in the pre-filter chamber 36 and hence water will enter the retention chamber 38 through conduit 50. As the water level in the retention chamber 38 rises, the bottom end 86 of fourth conducting rod will become submerged in waste water and hence the second waste water level signal will become active. Provided the waste water level has not reached the level of the bottom end 84 of the third conducting rod 72, the first waste water level signal will not be active. The signal generator 122 will retain the discharge signal inactive and hence the pump 66 will remain inoperative.

As the waste water level continues to rise, the bottom 84 of the third conducting rod 72 will become submerged thus rendering the first waste water level signal active. At this point, both the first and second waste water level signals will be active and the signal generator 122 will render the discharge signal active thereby rendering the pump 66 operative.

The pump 66 will pump the contents of the retention chamber 38 into the water 12 surrounding the boat 10. The level of waste water in the retention chamber will therefore decline. As the waste water level declines, the third conducting rod 84 will lose contact with the waste water thus rendering the first waste water level signal inactive. However, the signal generator circuit 122 will maintain the discharge signal in its active state, thus operation of the pump 66 will be uninterrupted.

When the level of waste water in the retention chamber 38 drops below the level of the fourth conducting rod 86, the second waste water level signal is rendered inactive. Because both the first and second waste water level signals will be inactive under this waste water level condition the signal generator 122 renders the discharge signal inactive thereby rendering the pump 66 inoperative.

Should the depth of the water 12 under the boat 10 become less than the pre-determined depth, the signal generating circuit 122 renders the discharge signal inactive thereby de-activating the pump 66 regardless of the level of water in the retention chamber 38. Thus, whenever the boat 10 is in water of a depth less than the pre-determined depth, the pump 66 will be rendered inoperative.

Assuming the boat is in shallow water, use of the shower 18 or sinks 14 or 16 will raise the level of waste water in the pre-filtered chamber 36 and hence water will enter the retention chamber 38 through conduit 50. As the water level in the retention chamber 38 rises, the bottom ends 86, 84, 80 and 78 of the conducting rods 74, 72, 70 and 68 respectively become successively submerged in the waste water. As illustrated in FIG. 2, the first conductive rod 68 is disposed in the retention chamber such that its bottom portion 78 is near the top portion 76 of the chamber. Thus, when the bottom portion 78 of the first conductive rod 68 is submerged, the waste water level in the retention chamber is near the top portion thereof. In other words, the retention chamber is full of waste water.

Provided the waste water is sufficiently conductive, as is normally the case, current will flow from common rod 88, through the waste water and into the first rod 68. Referring to FIG. 4, current will flow into the Schmitt trigger 136 corresponding to the first conducting rod 68. This causes a logic low signal to appear at the output of the Schmitt trigger. This logic low signal is transmitted by conductor 129 to the oscillator 135 thereby enabling the alarm circuit 131.

Upon enabling the alarm circuit 131, the oscillator 135 produces tone bursts which are input to amplifier 137. The amplifier amplifies the tone bursts and drives the speaker 133. The speaker produces audible tones in response to the tone bursts produced by the oscillator 135. Hence, when the waste water level in the retention chamber is near the top portion of the chamber (i.e. when the retention chamber is full of waste water) the speaker 133 emits an audible beeping sound. This audible sound serves to alert the operator that the retention chamber is full of waste water whereupon the operator should move the boat to deep water where the retention chamber can be emptied.

The operation of the signal generating circuit is summarized in the table of FIG. 5. The table indicates in state table format the next state of the pump in response to inputs comprised of the depth signal, the first water level signal, the second water level signal and the current pump state of operation. In general, input conditions appear in the four left hand columns of the table and the next state of the pump is indicated in the extreme right hand column.

While a specific embodiment of the invention has been described, such an embodiment should be considered illustrative of the invention only and not as limiting the scope of the invention as construed in accordance with the accompanying claims.

What is claimed is:
1. An apparatus comprising: means for disposal of Grey water from a tank in a boat including,
 (a) a depth measuring device responsive to water depth below the boat, the depth measuring device providing a depth signal representing said water depth in relation to a pre-determined water depth;
 (b) signal generating means for generating a discharge signal in response to the depth signal;
 (c) discharge means for discharging Grey water from the tank, the discharge means being responsive to the discharge signal.

2. An apparatus as claimed in claim 1 wherein the depth measuring device includes a depth sounder.

3. An apparatus as claimed in claim 2 wherein the depth sounder includes an alarm circuit for producing an alarm signal when said water depth is deeper than said pre-determined water depth.

4. An apparatus as claimed in claim 2 wherein the depth measuring device includes a signal conditioning circuit for connecting the depth sounder to the signal generating means.

5. An apparatus as claimed in claim 4 wherein the signal conditioning circuit includes an optical isolator.

6. An apparatus as claimed in claim 4 wherein the signal conditioning circuit includes a transient filter for rejecting transient responses of the depth sounder.

7. An apparatus as claimed in claim 6 wherein the filter includes time delay means for delaying the generation of the depth signal until a valid water depth measurement is obtained by the depth measuring device.

8. An apparatus as claimed in claim 1, the apparatus further including waste water level detecting means for detecting waste water level in the tank, the waste water level detecting means cooperating with the tank to provide a first waste water level signal representing waste water level in said tank.

9. An apparatus as claimed in claim 8 wherein the waste water detecting means includes a sensor responsive to waste water level in the tank 10. An apparatus as claimed in claim 9 wherein the waste water detecting means further includes a sensor interface connected to the sensor, the sensor interface being operable to provide the first waste water level signal to the signal generating means.

11. An apparatus as claimed in claim 10 wherein the sensor interface provides the first waste water level signal representing water level in relation to an upper point in the tank, the sensor interface also providing a second waste water level signal representing waste water level in relation to a lower point in the tank.

12. An apparatus as claimed in claim 11 wherein the upper position in the tank is near the one-third full level and the lower position is near the empty level of the tank.

13. An apparatus as claimed in claim 11 wherein the signal generating means includes a circuit having a first input for receiving the depth signal, a second input for receiving the first waste water level signal, a third input for receiving the second waste water level signal and a first output for providing the discharge signal.

14. An apparatus as claimed in claim 1 wherein the signal generating means includes a circuit having a first input for receiving the depth signal and a first output for providing the discharge signal.

15. An apparatus as claimed in claim 14 wherein the circuit includes digital logic elements connected between the first input and the first output.

16. An apparatus as claimed in claim 1, the apparatus further comprising waste water level detecting means for detecting the level of waste water in the tank, the waste water level detecting means being connected to signalling means for signalling an operator when the waste water level is near a top portion of the tank.

17. An apparatus as claimed in claim 16 wherein the signalling means includes means for producing an audible sound.

18. An apparatus as claimed in claim 1 wherein the discharge means includes a pump.

19. An apparatus as claimed in claim 1 wherein the discharge means includes a solenoid valve.

20. An apparatus comprising: means for retaining and disposing Grey water accumulated on a boat including,
   (a) a depth measuring device responsive to water depth below the boat, the depth measuring device providing depth signal representing said water depth in relation to a pre-determined water depth;
   (b) a tank for receiving and retaining said Grey water;
   (c) signal generating means for generating a discharge signal in response to the depth signal;
   (d) discharge means for discharging Grey water from the tank, the discharge means being responsive to the discharge signal.

21. An apparatus as claimed in claim 20 wherein the tank includes solid particle entrapment means.

22. An apparatus as claimed in claim 21 wherein the tank has a bottom portion and solid particle entrapment means includes partitions spaced apart along the bottom portion of the tank.

23. An apparatus as claimed in claim 22 wherein the tank includes a pre-filter chamber, a retention chamber and a conduit for communicating fluid between the pre-filter chamber and the retention chamber, the partitions being in the pre-filter chamber.

24. An apparatus as claimed in claim 20 wherein the tank further includes grease entrapment means.

25. An apparatus as claimed in claim 24 wherein the tank includes a pre-filter chamber, a retention chamber and a conduit for communicating fluid between the pre-filter chamber and the retention chamber and wherein the grease entrapment means includes the conduit, the conduit having first and second openings, the first opening being in the pre-filter chamber and the second opening being in the retention chamber, the first opening being lower than the second opening.

26. An apparatus as claimed in claim 25 wherein the tank includes a mesh screen in the pre-filter chamber, the mesh screen having a plurality of relatively small apertures to prevent solid particles from passing through said screen and entering the first opening in the conduit.

27. An apparatus as claimed in claim 20 wherein the tank includes a pre-filter chamber, a retention chamber and a conduit for conducting fluid between the pre-filter chamber and the retention chamber.

28. A method: comprising controlling the flow of Grey water from a tank in a boat, by
   (a) measuring the depth of water below the boat and generating a depth signal representing water depth in relation to a pre-determined water depth;
   (b) generating a discharge signal in response to the depth signal;
   (c) discharging Grey water from the tank in response to the discharge signal.

29. A method as claimed in claim 28, the method further comprising the step of detecting the level of waste water in the tank and generating a first waste water level signal representing waste water level in the tank.

30. A method as claimed in claim 29 wherein the step of generating a discharge signal includes generating said discharge signal in response to a combination of the depth signal and the first waste water level signal.

31. A method as claimed in claim 29 wherein the step of detecting the level of waste water in the tank further comprises the step of generating a second waste water level signal representing waste water level in relation to a lower position in the tank, the first waste water level signal representing the waste water level relative to an upper position in the tank.

32. A method as claimed in claim 31 wherein the step of generating a discharge signal further includes the step of second waste water level signal and the depth signal to generating the discharge signal in response to a combination of the first waste water level signal.

* * * * *